US010181208B2

(12) United States Patent
Witriol et al.

(10) Patent No.: US 10,181,208 B2
(45) Date of Patent: Jan. 15, 2019

(54) CUSTOM HEATMAPS

(71) Applicant: Microsoft Technology Licensing, LLC., Redmond, WA (US)

(72) Inventors: Daniel Benjamin Witriol, Kirkland, WA (US); Matthew W. Asplund, Kirkland, WA (US); Lewey Alec Geselowitz, Redmond, WA (US); Igor Borisov Peev, Seattle, WA (US); Ehab Sobhy Deraz, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/199,679

(22) Filed: Jun. 30, 2016

(65) Prior Publication Data

US 2017/0228899 A1  Aug. 10, 2017

Related U.S. Application Data

(60) Provisional application No. 62/293,674, filed on Feb. 10, 2016.

(51) Int. Cl.
*G06T 1/20* (2006.01)
*G06T 11/00* (2006.01)
*G06T 11/20* (2006.01)

(52) U.S. Cl.
CPC .......... *G06T 11/206* (2013.01); *G06T 11/001* (2013.01)

(58) Field of Classification Search
CPC .............................. G06T 11/206; G06T 11/001
See application file for complete search history.

(56) References Cited

U.S. PATENT DOCUMENTS 6,836,270 B2  12/2004  Du
7,912,288 B2  3/2011  Winn
(Continued)

FOREIGN PATENT DOCUMENTS

WO  2013078479 A1  5/2013
WO  13138846 A1  9/2013
(Continued)

OTHER PUBLICATIONS

Heatmap Layer, Google Maps JavaScript API v3, Google Developers, Aug. 18, 2017, Internet Archive Wayback Machine, https://web.archive.org/web/20140818121157/https://developers.google.com/maps/documentation/javascript/heatmaplayer, pp. 1-4.*
(Continued)

*Primary Examiner* — Jeffery A Brier
(74) *Attorney, Agent, or Firm* — Merchant & Gould

(57) ABSTRACT

Performance and capability improvements of computer devices that provide digital images of heatmap visualizations for datasets are provided via both systems and methods. A value-color spectrum is correlated to the dataset via a multi-pass rendering. The multi-pass rendering yields a two-channel mask, which is applied to a map to show the dataset in a heatmap visualization on that map, and may be continually used as the map is manipulated by a user. User interface tools are also provided to enable a user to specify a custom value-color spectrum, how the dataset is to be aggregated, the area of effect for a data point in the visualization, the strength of effect for a data point in the visualization, and which specifies how a dataset will be visually represented in a heatmap.

20 Claims, 11 Drawing Sheets

(56) References Cited

U.S. PATENT DOCUMENTS

| | | |
|---|---|---|
| 9,131,196 B2 | 9/2015 | Lim et al. |
| 9,881,399 B2 | 1/2018 | Peev et al. |
| 2008/0079723 A1 | 4/2008 | Hanson et al. |
| 2008/0270946 A1 | 10/2008 | Risch |
| 2009/0217147 A1 | 8/2009 | Thomsen |
| 2010/0318512 A1 | 12/2010 | Ludwig |
| 2011/0040760 A1 | 2/2011 | Fleischman et al. |
| 2011/0044533 A1 | 2/2011 | Cobb et al. |
| 2011/0169819 A1 | 7/2011 | Ian |
| 2011/0179370 A1* | 7/2011 | Cardno ............. G06F 17/30994 715/771 |
| 2011/0274344 A1 | 11/2011 | Lee et al. |
| 2012/0053986 A1* | 3/2012 | Cardno ............. G06F 17/30572 705/7.29 |
| 2012/0066649 A1 | 3/2012 | Rashed et al. |
| 2012/0191704 A1 | 7/2012 | Jones |
| 2012/0218254 A1 | 8/2012 | Abeln |
| 2013/0031142 A1 | 1/2013 | Wester |
| 2013/0188887 A1 | 7/2013 | Chan et al. |
| 2013/0308866 A1 | 11/2013 | Lin et al. |
| 2014/0089297 A1* | 3/2014 | Cardno ............. G06F 17/30572 707/722 |
| 2014/0307066 A1 | 10/2014 | Zhu |
| 2015/0161525 A1 | 6/2015 | Hirose et al. |
| 2015/0213631 A1 | 7/2015 | Vander Broek |
| 2015/0348294 A1 | 12/2015 | Sridharan et al. |
| 2016/0012627 A1 | 1/2016 | Kishikawa et al. |
| 2016/0065864 A1 | 3/2016 | Guissin |
| 2016/0275692 A1 | 9/2016 | Raburn et al. |

FOREIGN PATENT DOCUMENTS

| | | |
|---|---|---|
| WO | 2014025948 A1 | 2/2014 |
| WO | 2014130044 A1 | 8/2014 |

OTHER PUBLICATIONS

"Heatmap Based on Average Weights and not on the Number of Data Points", Retrieved on: Jan. 21, 2016 Available at: http://stackoverflow.com/questions/14461954/heatmap-based-on-average-weights-and-not-on-the-number-of-data-points.

Zhihu, et al., "Modified Bilateral Filtering Algorithm with Gradient Weight Factor", In Proceedings of International Conference on Mechatronics and Control, Jul. 3, 2014, pp. 2198-2202.

"How to Build Table Components", Published on: Jan. 30, 2013 Available at: https://klipfolio.uservoice.com/knowledgebase/articles/59884-how-to-build-table-components.

"Visualize your Data in Power Map", Retrieved on: Jan. 21, 2016 Available at: https://support.office.com/en-us/Article/Visualize-your-data-in-Power-Map-df891544-78e7-413e-b074-eb96ef23f7d0.

"Warning: Avoid These Pitfalls When Calculating Deltas", Published on: Apr. 29, 2014 Available at: https://labescape.com/posts/tips/calculating-deltas-in-excel.html.

Barathm, et al., "Parallel Programming in Native Code", Published on: Mar. 14, 2012 Available at: http://blogs.msdn.com/b/nativeconcurrency/archive/2012/03/14/gaussian-blur-using-c-amp.aspx.

Verdon, Charles, "Custom Map with Power Map for Excel", Published on: Dec. 19, 2014 Available at: http://blogs.technet.com/b/cansql/archive/2014/12/19/custom-map-with-power-map-for-excel.aspx.

"3D Analyst and ArcScene", Retrieved on: Jan. 29, 2015 Available at: http://help.arcgis.comien/arcgisdesktop/10.0/help/index.html#/00q8000000p0000000.

Woodson, Jennifer, "Voxler® 3", Published on: Feb. 2, 2015 Available at: http://www.goldensoftware.com/products/voxler.

"Get Started with Power Map", Retrieved on: Jan. 29, 2015 Available at: https://support.office.com/en-us/article/Get-started-with-Power-Map-88a28df6-8258-40aa-b5cc-577873fb0f4a?ui=en-US&rs=en-US&ad=US#__exploring_sample_datasets.

"Amira 3D Software for Life Sciences", Published on: Dec. 16, 2014 Available at: http://www.fei.com/software/amira-3d-for-life-sciences/.

Esposito, Pat, "First Look: Microsoft Power BI", Published on: May 29, 2014 Available at: http://redmondmag.com/articles/2014/06/01/first-look-microsoft-power-bi.aspx.

"Basketball Geek", Retrieved on: Feb. 9, 2015 Available at: http://www.basketballgeek.com/data/.

* cited by examiner

CUSTOM HEATMAPS

CROSS-REFERENCE TO RELATED APPLICATIONS

This application claims the benefit of U.S. Provisional Application No. 62/293,674, filed Feb. 10, 2016.

BACKGROUND

Data may be presented to users via a variety of systems and methods that use myriad formats. One such format is a heatmap, which applies various colors to a map or map object to show variations in values associated with a location or object on the map. For example, traffic flow on roads may be illustrated as various colors of the roads in a data visualization application, where red signifies heavy traffic, yellow mild traffic, and green low traffic. Heatmaps use data that include location information, which may be signified by latitude and longitude values, addresses, map-specific coordinates (Cartesian, polar, etc.), and object identifiers (e.g., the Empire State building, Interstate 40 from mile marker 386 to mile marker 389, school district 5) that can be correlated to coordinates or ranges of coordinates.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

As will be appreciated, heatmaps that are generated by data visualization applications are digital images that show a dataset against a map. Depending on the data visualization application, the digital image of the heatmap may be manipulated by the user (e.g., to zoom in/out, rotate, pan, advance/retreat in time, switch between two and three dimensions, add/remove detail) to show different aspects of the image.

Of particular note to heatmapping as a data visualization format is the correlation of colors to data values and the choice of those colors, as many persons interpret colors differently due to physiological differences (e.g., color blindness), hardware differences (e.g., monitor resolutions, color settings, glare), and ambient lighting conditions. In some aspects, data visualization applications re-render the dataset to the map as the user manipulates the image (or the underlying data), which can be a processor resource intensive operation. Therefore, the processor efficient manipulation of custom value-color spectra to consistently apply value-color spectra as users manipulate the images or modify the hardware on which the image is viewed (e.g., opening the image on a new device, changing a monitor resolution, switching a color mode) is particularly important to the interpretation of heatmapped data.

Therefore, systems and methods are provided that improve the performance of computer devices that provide digital images of heatmap visualizations for datasets. A value-color spectrum is correlated to the dataset via a multi-pass rendering. The multi-pass rendering yields a two-channel mask, which is applied to a map to show the dataset in a heatmap visualization on that map, and may be continually used as the map is manipulated by a user. User interface tools are also provided to enable a user to specify a custom value-color spectrum, how the dataset is to be aggregated, the area of effect for a data point in the visualization, the strength of effect for a data point in the visualization, and to specify how a dataset will be visually represented in a heatmap.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

and

Figure 9:
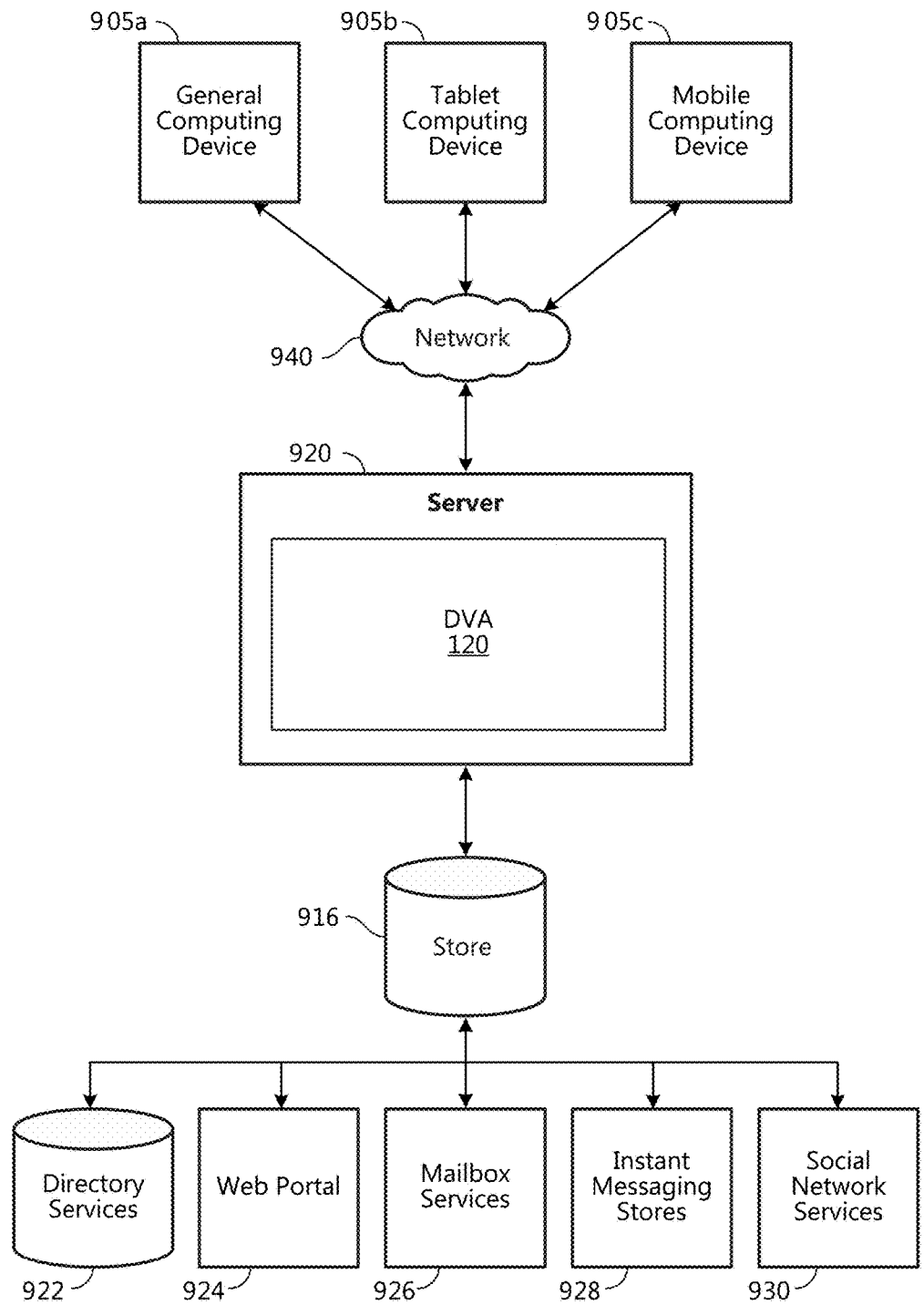

FIG. 9 is a block diagram of a distributed computing system.

DETAILED DESCRIPTION

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

As described herein, systems and methods for improved heatmapping are provided. User interface (UI) tools enable users to customize the heatmaps for greater readability and provide an enhanced user experience. The improvements also reduce the processing resources required when reacting to user manipulation of the image that includes the heatmap. The heatmap is generated in a three-pass render as a two-channel mask to overlay the background of the image and thereby provide a heatmapped visualization of a dataset.

As used herein, ordinal terms (first, second, third, etc.) may be associated with various features or components of the present disclosure to distinguish them from each other, but one of ordinary skill in the art will appreciate that these terms do not necessarily impart a specific order to those features or components. For example, a first component may be any of a given type of component of a system, and a second component may be any of a given type of component of a system that is not the first component, unless explicitly stated otherwise. As will also be appreciated, ordinal terms, when apparent from the context in which they are used (e.g., when used to discuss timing) may reflect an ordered sequence. For example, a first time denotes a time occurring before a second, third, fourth, etc., time. Similar terms such as "given" or "particular" may also be used to distinguish features or components with similar names. In respect to the drawings, and their discussion herein, specific features or components will use a shared part number followed by a letter designator to distinguish them from one another, and the feature or component, when referred to in the general sense, will use the shared part number without a letter designator.

Values for colors discussed herein may be presented according to various color models, such as Red-Green-Blue (RGB), Cyan-Magenta-Yellow-Black (CMYK), L*a*b, Hue-Saturation-Lightness, etc., wherein the individual values are presented on a channel-by-channel basis with a colon separating each channel. Unless stated otherwise, values of colors are discussed in relation to a three-channel representation of a thirty-two bit Red-Green-Blue color model using eight bits per channel (the remaining eight bits reserved for alpha/transparency channel values, which are not shown). For example, the color red may be presented as 255:0:0, the color green as 0:255:0, the color black as 255:255:255, etc. One of ordinary skill in the art will be able to read and understand these values within the context that they are given in the present disclosure, and will appreciate that other representations of color values and number systems (e.g., hexadecimal) are possible.

Figure 1:
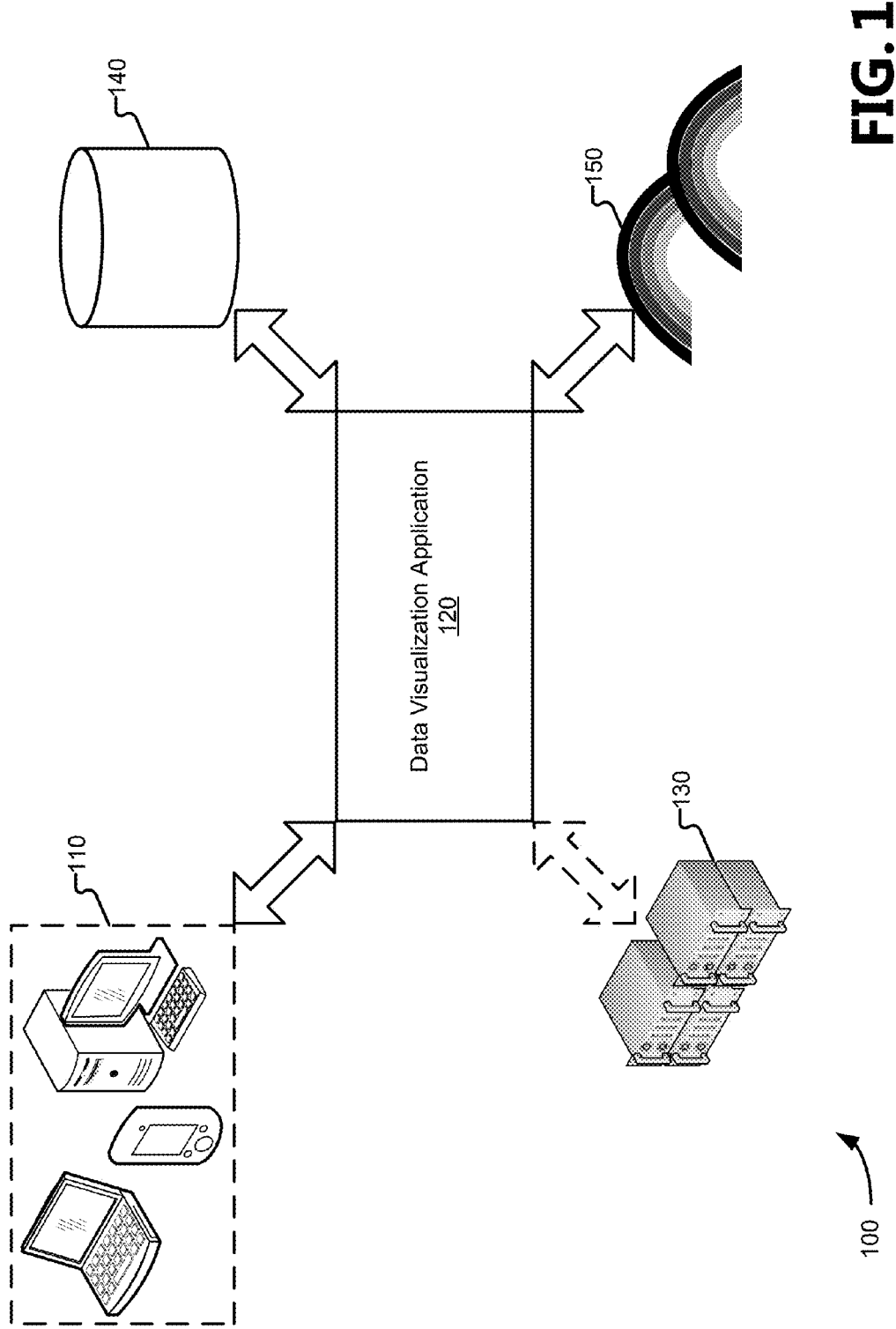
FIG. 1 is a block diagram of an example operating environment in which the present disclosure is practiced.

FIG. 1 is a block diagram of an example operating environment 100 in which the present disclosure is practiced. As illustrated, a Data Visualization Application (DVA) 120 is in communication with a user device 110 and, optionally, a cloud server 130. The DVA 120 has access to a data source 140 and value-color spectra 150, by which a heatmap is provided to the user device 110.

The DVA 120 is a computer program executed by either the user device 110 or, optionally, the cloud server 130, which provides the DVA 120 to the user device 110 as a service, for example, via a thin client, accessed via a web browser from the user device 110. The DVA 120 may be a standalone application used for data visualization or may be part of another application or productivity suite, for example, EXCEL® or NUMBERS® spreadsheet software (available from MICROSOFT CORP. of Redmond, Wash. and APPLE INC. of Cupertino, Calif., respectively) or ACCESS® database software, (available from MICROSOFT CORP.), as part of a software suite installed on the user device 110 or accessed via the cloud server 130, for example, via the OFFICE 365™ or Google Docs™ suites of online productivity programs (available from MICROSOFT CORP. and ALPHABET INC. of Mountain View, Calif., respectively) or a map sub-application of the BING® or Google® search engine, (also available from MICROSOFT CORP. and ALPHABET INC., respectively).

The user device 110, cloud server 130, and data source 140 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers. The hardware of these computing systems is discussed in greater detail in regard to FIGS. 7, 8A, and 8B. As will be appreciated, the cloud server 130 and the data source 140 may be part of a distributed system, and composed of a multitude of individual computing systems, and multiple user devices 110 may be in communication with the DVA 120 for the presentation of heatmaps.

The user may designate the data source 140 via the DVA 120, and the data source 140 may be part of a document accessed by the DVA 120. In various aspects, the data source 140 is part of the user device 110, such as a hard drive local to the user device 110. In other aspects, the data source 140 is managed by the cloud server 130 and is remote from the user device 110, for example, a server storing documents for the user as part of a cloud storage solution. In yet other aspects, the data source 140 is managed independently from the user device 110 or the cloud server 130, for example, a database managed by a third party that is available on the Internet, a different device available via an intranet or local network, etc.

The data source 140 includes at least one dataset that will be heatmapped, which includes value information and location information. Value information include those data that are to be displayed to the user in a visualization. Examples of value information include precipitation data (e.g., inches of rain/snow fall for a period of time at a location), real estate data (e.g., cost of renting/buying at a given region), traffic data (e.g., traffic speed on a given road, throughput of vehicles on a given road during a given time), and the value information may be visualized in heights of bar graphs, arcs sizes in pie charts, circumferences in bubble charts, colors in heatmaps, etc., and combinations thereof. Location information provide context for the value information and enable the DVA 120 to position the value information against a background so that that value information are provided in context to the background in the visualization. Examples of location information latitude and longitude coordinates, Cartesian coordinates, polar coordinates, addresses, location identifiers (e.g., Marin county, the Eiffel Tower, Route 66) that can be correlated to coordinates or ranges of coordinates, etc.

In some aspects, a background image is provided by the DVA 120 onto which the heatmapped dataset will be projected, examples of which include two-dimensional maps, three-dimensional maps, two-dimensional projections of three-dimensional maps, topographic maps, globes, etc. The dataset may specify a background image provided by the DVA 120 to use (or a portion thereof) or the DVA 120 may determine, based on the location data, the background image (and associated settings, such as zoom and rotation) to use in an initial visualization. In other aspects, the dataset includes a background image or specifies a background image provided externally to the DVA 120. For example, a video game designer may specify an in-game map to use, or a historian may specify a historic map, which are provided to the DVA 120 in the dataset either with an associated coordinate system or allowing the DVA 120 to create a coordinate system based on the dimensions and features (e.g., borders, colors, labels) of the background image. The background image may be stored as various types of digital images in two or three dimensions, including, but not limited to bitmaps, Graphic Interchange Format (GIF), Joint Photographic Experts Group (JPEG), Computer Aided Design (CAD) files, etc.

When heatmapping the dataset to the background image, the DVA 120 accesses a value-color spectrum 150 (or multiple value-color spectra 150 from which one value-color spectrum 150 is selected) which is correlated to the dataset to produce a two-channel mask to produce the heatmap that will overlay the background image (or the entire available screen of a viewing device). The value information and a weight of the value information are included in the first and second channels respectively and are organized according to the location information associated with the data points. In various aspects, the weights of the value information include counts of data points sharing location information (e.g., two data points including identical location information would result in a weight of two for that location information) or user specified weights. As will be appreciated, the location information may be generalized to fit a visualization (e.g., dropping precision, mapping addresses or features to coordinates, mapping coordinates to addresses or features) or reduce complexity for the DVA 120, which will result in a different number of data points being considered to share location information than the dataset originally indicated.

Rather than forcing the addition of a new category in a database or spreadsheet for an average value, the two-channel mask enables users to freely switch between aggregating methods for the value information of the dataset. Such aggregation methods include, but are not limited to: minimum, maximum, sum, and average (mean, median, and mode). This provides memory storage and processing improvements for the DVA 120, or an associated application, by not requiring a separate pre-visualization calculation. Moreover, as the user manipulates the digital image, the DVA 120 is able to adjust how value information are grouped on the fly. For example, if a user begins zoomed into a map to view a visualization of county-by-county precipitation rates within a given state and then zooms out to view the entire nation, the details of the individual counties may be lost, and the DVA 120 will automatically regroup the data to visualize precipitation data on a state-by-state basis without having to create new categories in a database or spreadsheet to store data for county-by-county and state-by-state averages (or country-by-country) as the user manipulates the image.

When the DVA 120 applies a heatmap visualization format to the background image, a value-color spectrum 150 is used to assign colors to the two-channel mask. The value-color spectrum 150 specifies several colors and the ranges for which those colors are applied to represent the dataset. In various aspects, reference colors are set for specific values (e.g., 50), relative values within a range of a value-color spectrum 150 (e.g., at 50%) or combinations thereof (e.g., for values below 50).

For example, in a grayscale value-color spectrum 150, white may be mapped to a minimum value, black to a maximum value, and various different shades of gray (e.g., one, thirty, fifty) ranging from white to black are assigned in a gradient to progressively larger values. Similarly, in a two-color value-color spectrum 150, a first reference color (having red green blue (RGB) or Cyan Magenta Yellow Black (CMYK) values) and a second reference color (having different RBG or CMYK values) are assigned to the minimum and maximum values and colors are blended for the interstitial values (e.g., the RGB or CMYK values of an median value will reflect the mean of the first color and the second colors RGB or CMYK values). Moreover, in a multi-color value-color spectrum 150, n reference colors may be assigned to n values or relative positions in the data (e.g., x % of maximum) so that multiple blendings of colors occur. For example, where n is equal to three, if red were set to a minimum value (e.g., RGB of 255:0:0), green were set to a median value (e.g., RGB of 0:255:0 at 50% of the maximum), and blue were set to a maximum value (e.g., RGB of 0:0:255), the colors assigned to 25% and 75% would be mixture of red and green, and green and blue, respectively (e.g., RGB of 127:127:0 and 0:127:127 respectively). As will be appreciated, the precise mapping of values to colors will vary in different aspects depending on the properties of the value-color spectrum 150 that dictate the speed at which color vary across the spectrum and how the dataset is normalized to the value-color spectrum 150.

Value-color spectra 150 may be stored locally to the user device 110, at a cloud server 130, or a third party database. In various aspects, the value-color spectra 150 are stored as bitmap images of the spectra, while in other aspects, they may be stored as mipmaps for various sizing options, or as another file type. When a value-color spectrum 150 is stored as a mipmap, each color channel may be stored separately, or the color channels may be stored in a combined form (i.e., a full color image of the spectrum including RGB/CMYK values).

In various aspects, a user may select to create a custom value-color spectrum 150 for use in a heatmap visualization or select a pre-rendered value-color spectrum 150, from storage as discussed above. A user may use a UI, such as those illustrated in FIGS. 3 and 4, and may store the custom value-color spectrum 150 for later user in a memory storage device, or keep the custom value-color spectrum 150 for use only for a session and discard the custom value-color spectrum 150 at the end of the session.

Figure 2A:
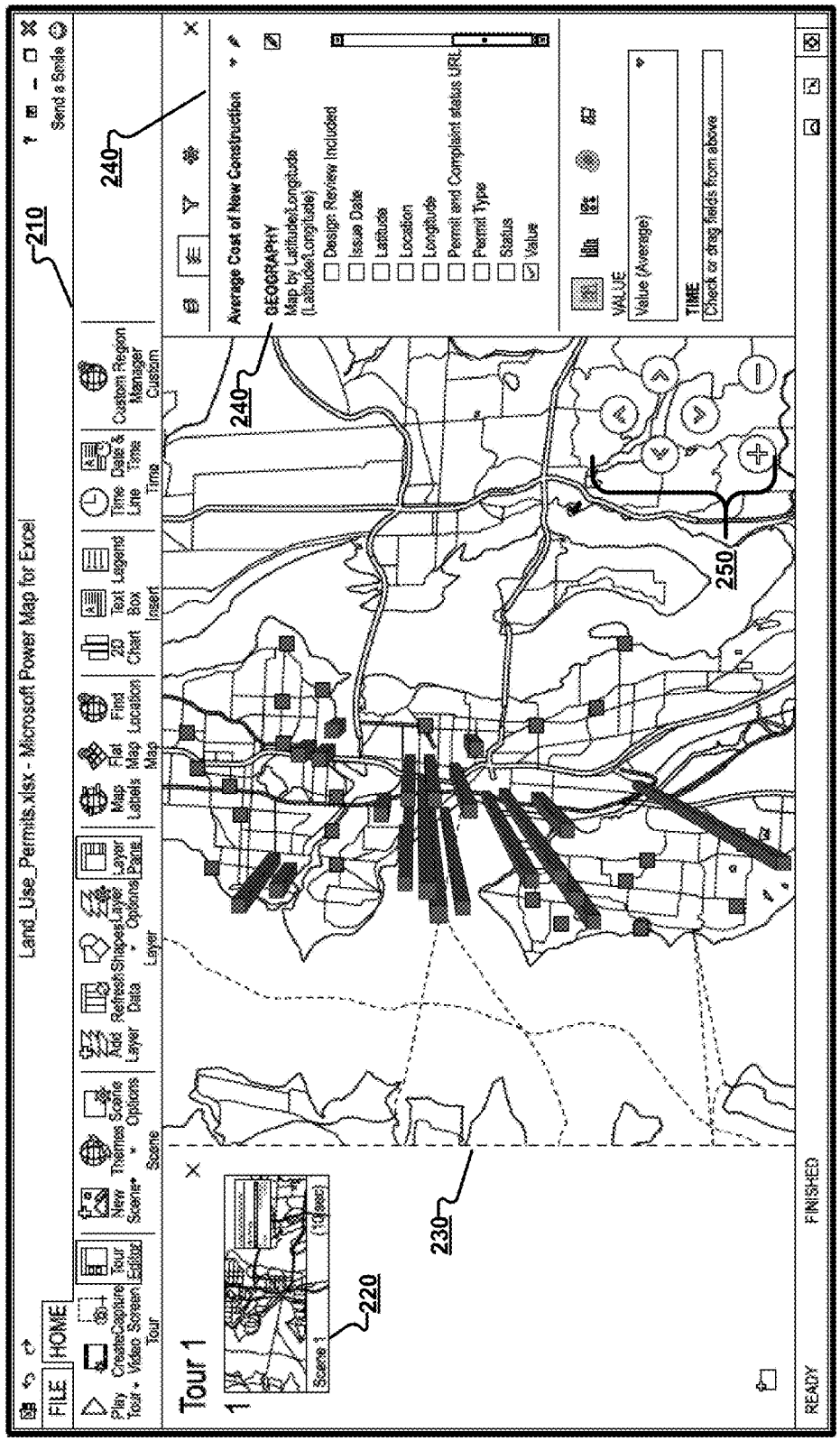
FIGS. 2A and 2B illustrate example aspects of a user interface presenting different visualizations of the same datasets, using columns and heatmaps respectively.
Figure 2B:
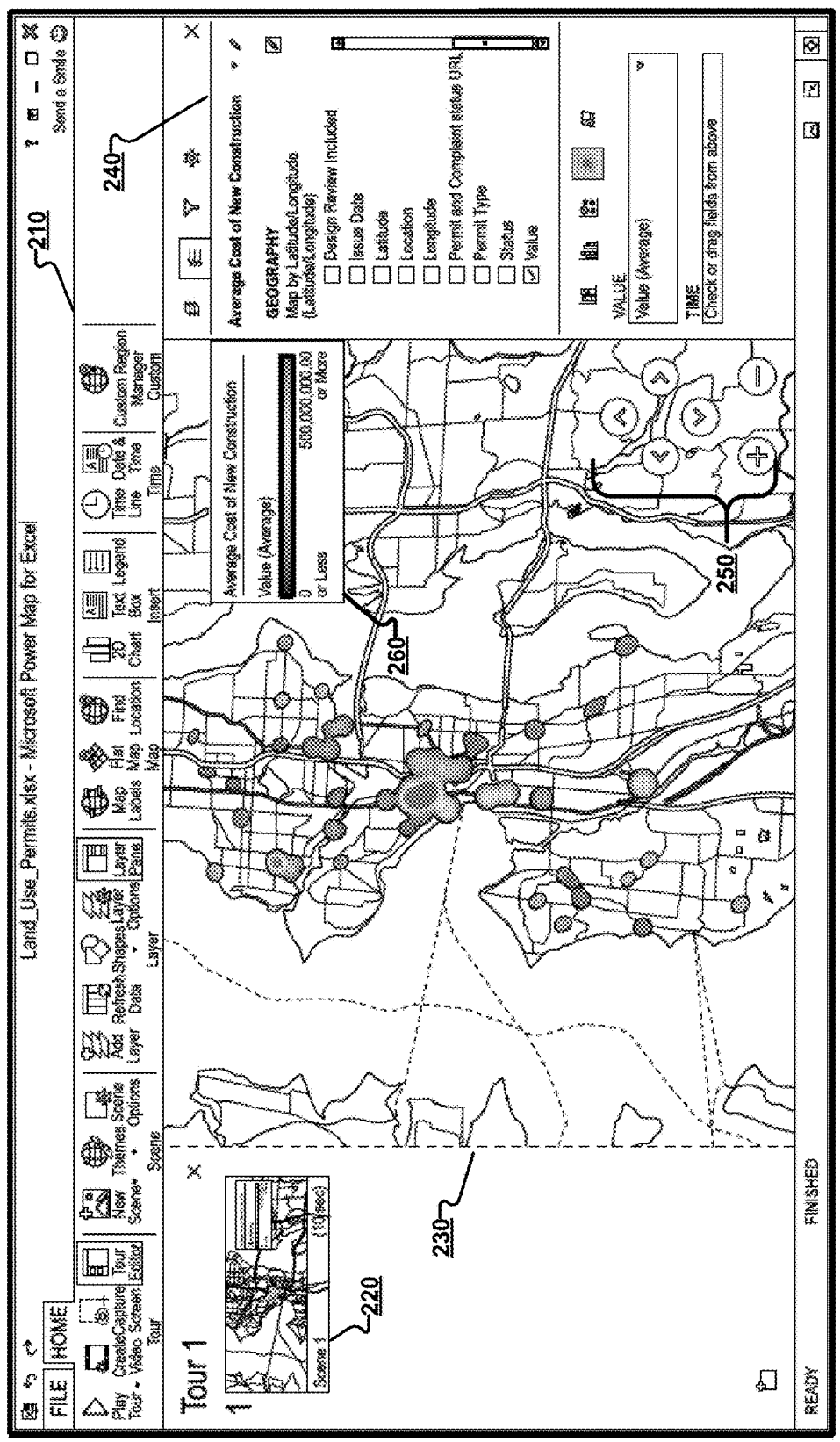

FIGS. 2A and 2B illustrate example aspects of a DVA user interface (UI) 200A, 200B (collectively, DVA UI 200) for a DVA 120 presenting different visualizations of the same datasets, using columns and heatmaps respectively. Within the DVA UI 200, a ribbon 210 or other menu interface is provided, to enable the user to select various control icons to manipulate the data or the visualization. The DVA UI 200 also includes a scene pane 220 for illustrating a position and a length of a visualization as a scene in a tour, and to set animations or transitions between scenes. The display pane 230 provides the visualization to the user, and the control pane 240 enables the user to manipulate which aspects of a dataset, or which datasets, are visualized by the DVA 120. Visualization navigation controls 250 enable the user to zoom in/out, pan, tilt, rotate, and shift the display of the visualization. In some aspects, such as is illustrated in FIG. 2B, a legend 260 may be provided to give additional detail on the interpretation of the visualization. As will be appreciated, the DVA UI 200 illustrated in FIGS. 2A and 2B are provided as non-limiting examples; one of ordinary skill in the art will know that other arrangements of elements in an interface are possible.

The DVA UI 200 enables the user to customize how datasets are visualized and how the DVA 120 presents those visualizations. When visualizations are arranged in a tour as scenes, the user is enabled to set animations or transitions between multiple scenes and set how long a scene is to be displayed (and at what presentation specification (e.g., angle, lighting, zoom magnification, selection of a visualization, included datasets, selected aggregation methods)). For example, an animation between the scene shown in FIG. 2A and the scene shown in FIG. 2B may show the columns "melting" into pools of colors to present a heatmap format visualization, or the animation may run in reverse—showing the columns growing from the pools of colors into the columns. As will be appreciated, other animations or transitions (e.g., fade, swipe, appear, morph) are possible and heatmap format visualizations may animate or transition to or from several other formats of visualizations besides columns, and may animate or transition between datasets that are visualized as various formats of visualizations.

In various aspects, when the scene includes a time component, the dataset will be displayed for a set period of time. In other aspects, when the dataset also includes a time component, the dataset will be animated across its time component over the set period of time so that the values of the dataset, and their display, will vary across the time that the scene is active. The user may specify a data series to use a time component or the DVA 120 may detect a series designated as a time component for automatic inclusion as the time component.

In the heatmap format visualization shown in FIG. 2B, the user has specified several preferences for how the dataset is to be displayed as a heatmap and may freely adjust those preferences to manipulate the display of the heatmap. For example, the user may specify which series of a dataset is/are to be used as the value information to heatmap, and which data series is/are to be used as location information. The user may also select or customize a value-color spectrum 150 to use when visualizing the dataset, which may be done according to various UI, such as those illustrated in FIGS. 3 and 4. The user may also change influence properties of the heatmap, including, but not limited to its transparency, bloom effects, and color offsets (e.g., a color blind mode, color matching between viewing devices).

Figure 3:
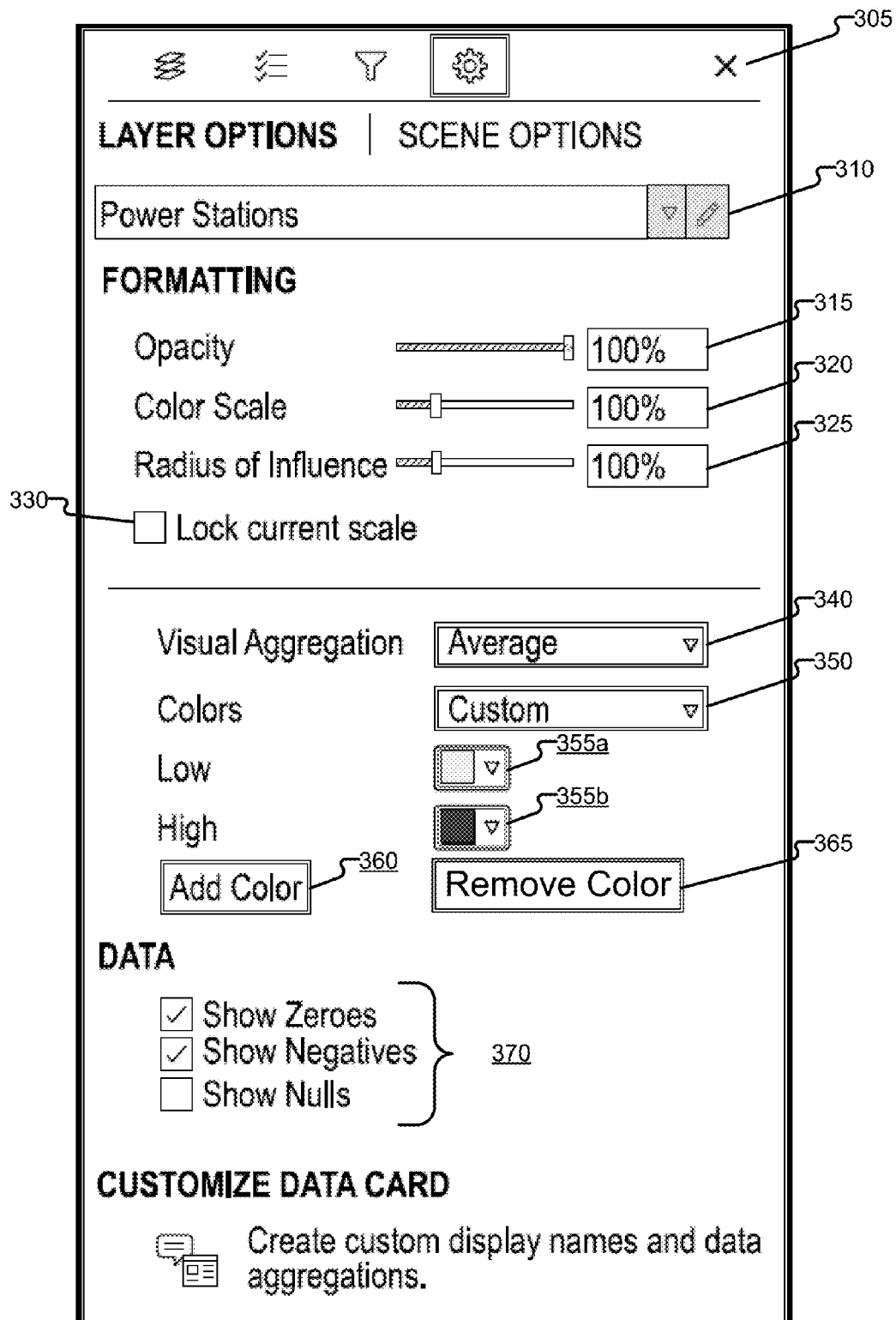
FIG. 3 illustrates an example layer UI.

FIG. 3 illustrates an example layer UI 300. In the example layer UI 300, several controls are illustrated for manipulating the display of a dataset as a layer in the visualization presented in the DVA 120. In various aspects, the layer UI 300 may be provided as a modal window or as a non-modal window, and may be docked to an edge of the displayed DVA 120 or may be a free-floating window. As will be appreciated, the layer UI 300 illustrated in FIG. 3 is provided as a non-limiting example to discuss components and features; one of ordinary skill in the art will understand that the controls discussed herein may be provided in alternate arrangements, with alternate iconography, and with controls added or omitted to meet the needs of alternate aspects that differ from that shown in FIG. 3.

UI controls 305 are provided to access various functions of the layer UI 300, which may be set on various tabs or sub-UIs. As illustrated in FIG. 3, the layer UI 300 is illustrated with various controls to enable a user to manipulate the dataset for display as a heatmap. Other tabs accessible via the UI controls 305 may provide for configurations to affect an order of layers (e.g., which layer is "above" another), the datasets or data series that are used in a visualization, filtering options for the datasets (e.g., which data series to include, which ranges in the dataset to include), timing of a display of a dataset, etc. For example, the control pane 240 illustrated in FIGS. 2A and 2B display a different tab of the layer UI 300 than illustrated in FIG. 3, which enables the user to select data series or datasets that are used in the visualization.

As part of the controls to manipulate the dataset for display, the layer UI 300 includes name controls 310, which enable the user to select a dataset and name the layer for later manipulation. The layer UI 300 also includes several influence controls for formatting how the layer is to be displayed by the DVA 120 relative to the background image. Example influence controls include the opacity control 315, operable to affect the transparency of the layer's display relative to the background image, the color scale control 320, operable to affect color options (e.g., hue, saturation, brightness) to amplify or to dampen the effect of color stops in the value-color spectrum 150, and the radius of influence control 325, operable to affect how far the colors bloom from their associated data points in a heatmap format visualization. As illustrated, the influence controls are executed as slider bars and matched text input boxes, although other controls are possible (radial wheels, drop down menus, etc.). Also included is a lock control 330, operable to lock the scale of the layer to the current zoom level of the visualization, so that as the user zooms in or out, the size of the blooms (but not necessarily their positions) will remain the same irrespective of the size of the background image. The lock control 330 is executed as a checkbox, but other controls are possible (toggle, slider bar, radio button, etc.).

An aggregation control 340, illustrated as a drop down menu, enables the user to select how the value information from the dataset will be displayed. For example, a user may select from average (mean, median, or mode), maximum, minimum, or sum of the values for display in the heatmap format visualization. Also illustrated as a drop down menu is a spectrum control 350, provided to enable the user to select a spectrum to apply to the heatmap visualization. For example, several options for value-color spectra 150 will be presented in the spectrum control 350 as names, previews of the value-color spectra 150 (e.g., as gradients or start/end color pairs for gradients), or combinations thereof. As will be appreciated other controls besides drop down menus are possible for the aggregation control 340 and the spectrum control 350 (radio buttons, text entry box, slider bar, etc.).

In various aspects, the spectrum control 350, when selected, displays several examples of value-color spectra 150 built into the DVA 120, any previously-saved value-color spectra 150 created by a user (space permitting), and an option for a new custom value-color spectrum 150. In various aspects, when a selection is made from the spectrum control 350, at least two reference color controls 355 are provided, to enable the user to customize what colors are used as reference colors for a value-color spectrum 150 in a heatmap format visualization. Reference colors define the colors at which the value-color spectra 150 start and stop (or pause or change "direction" when using more than two reference colors). As illustrated, a first reference color control 355a and a second reference color control 355b are shown as drop down menus. Alternatively, or in addition, the reference color control 355 may open a new sub-window (modal or non-modal) to prompt the user to select a color and options for the color, including patterns or a no-color (i.e., transparent) option. As will be appreciated, a no-color option may be represented in several ways, including, a checkerboard pattern, text description, a transparency option set to 100%, etc. Other colors and options for those colors may be presented as icon previews of those colors, RGB or CMYK channel slider bars, rotary wheels, or text boxes, a selectable rainbow (or other spectrum), and may include user favorites and built-in suggestions for colors as part of a palette.

The reference colors shown in the first reference color control 355*a* and the second reference color control 355*b* form the basis value-color spectrum 150 that will be applied to create a heatmap visualization. The gradient of colors between the two reference colors will show values of corresponding scale between a high and a low value/color pair associated with the reference colors. For example, a low reference color of white and a high reference color of black would result in a value-color spectrum 150 with a grayscale gradient running from white to black across various shades of gray. As will be appreciated, more than two colors may be set as reference colors in a value-color spectrum 150. When more than two colors are set as reference colors, the gradients will run from reference color to reference color. For example, if the user added a reference color of red between white and black in the above example, the resulting value-color spectrum 150 would result in two gradients running from white to red and from red to black respectively.

In various aspects, the reference color controls 350 are draggable within the layer UI 300 to enable the user to reorder where in the value-color spectrum 150 the reference colors are placed. Similarly, for reference color controls 355 medial to the low and high reference colors, text box controls (or dropdown, slider bar, etc.) may be provided to adjust where in the value-color spectrum 150 the reference color is placed. For example, in relation to the above example of a white-red-black spectrum, the medial reference color of red may be automatically placed equidistant between the low and high reference colors (e.g., at 50%), and the user may adjust this placement by manipulating the associated control.

To enable a user to increase the number of references colors, an add color control 360 is provided to add reference colors to a value-color spectrum 150. When the add color control 360 is actuated, a new color is added to the value-color spectrum 150 and a corresponding reference color control is added to the layer UI 300. In various aspects, the position of the added color in the value-color spectrum 150 (and the corresponding position of the reference color control 355 in the layer UI 300) may vary, for example, the new color may be added immediately after the low color (shifting all colors but the low color higher), immediately before the high color (shifting all colors but the high color lower), as the low color (shifting all colors higher), as the high color (shifting all colors lower). Additionally, the color that is added as a reference color may vary in different aspects. In some aspects, the new color may be selected from a theme from the tour provided by the DVA 120, a theme or sequence of colors associated with a given value-color spectrum 150, based on the current reference colors (e.g., the same as one reference color, the medial color between two reference colors), a set color (e.g., all added reference colors will be color x), or a random color.

Similarly, a remove color control 365 is provided to enable the user to remove reference colors from the value-color spectrum 150 when there are more than two reference colors. In some aspects, the remove color control 365 is one of a plurality of controls that are provided as buttons associated with each reference color control 355, as an option in a dropdown menu of a reference color control 355, or as a single button in the layer UI 300 that may act on the last added, last selected, highest, or lowest reference color or may act on reference colors associated with selected check boxes (not illustrated) that are presented with each reference color when more than two reference colors controls 355 are provided.

When a user modifies a pre-existing value-color spectrum 150 by changing the colors used as reference colors, adding/removing/reordering reference colors, etc., the spectrum control 350 may, in some aspects, change to "New Custom," while in other aspects, the spectrum control will remain displaying the selection on which the customized value-color spectrum 150 is based. In various aspects, the changes made to a value-color spectrum 150 may be saved by the user for later use in different tours as a new value-color spectrum 150 or as a update to an existing value-color spectrum 150. In other aspects, only custom value-color spectra 150 may have changes saved for use in other tours; built-in value-color spectra 150 may be write protected. As will be appreciated, to enable a reader using a different computing device to properly view the heatmap visualization as the user intends, any custom value-color spectrum 150 may be saved as part of the file containing the visualization.

Within the layer UI 300, data controls 370 are also provided, to enable the user to select how different data are handled when mapped to the value-color spectrum 150. For example, check boxes to enable the display of values of zero, negative values, or null values (e.g., portions of the dataset missing a value, having a non-numeric value, or an error code as a value) may be provided to affect whether the associated values are considered part of the dataset for purposes of assigning values to colors, while in other aspects these values may be mapped to a no-color (i.e., are 100% transparent).

Figure 4:
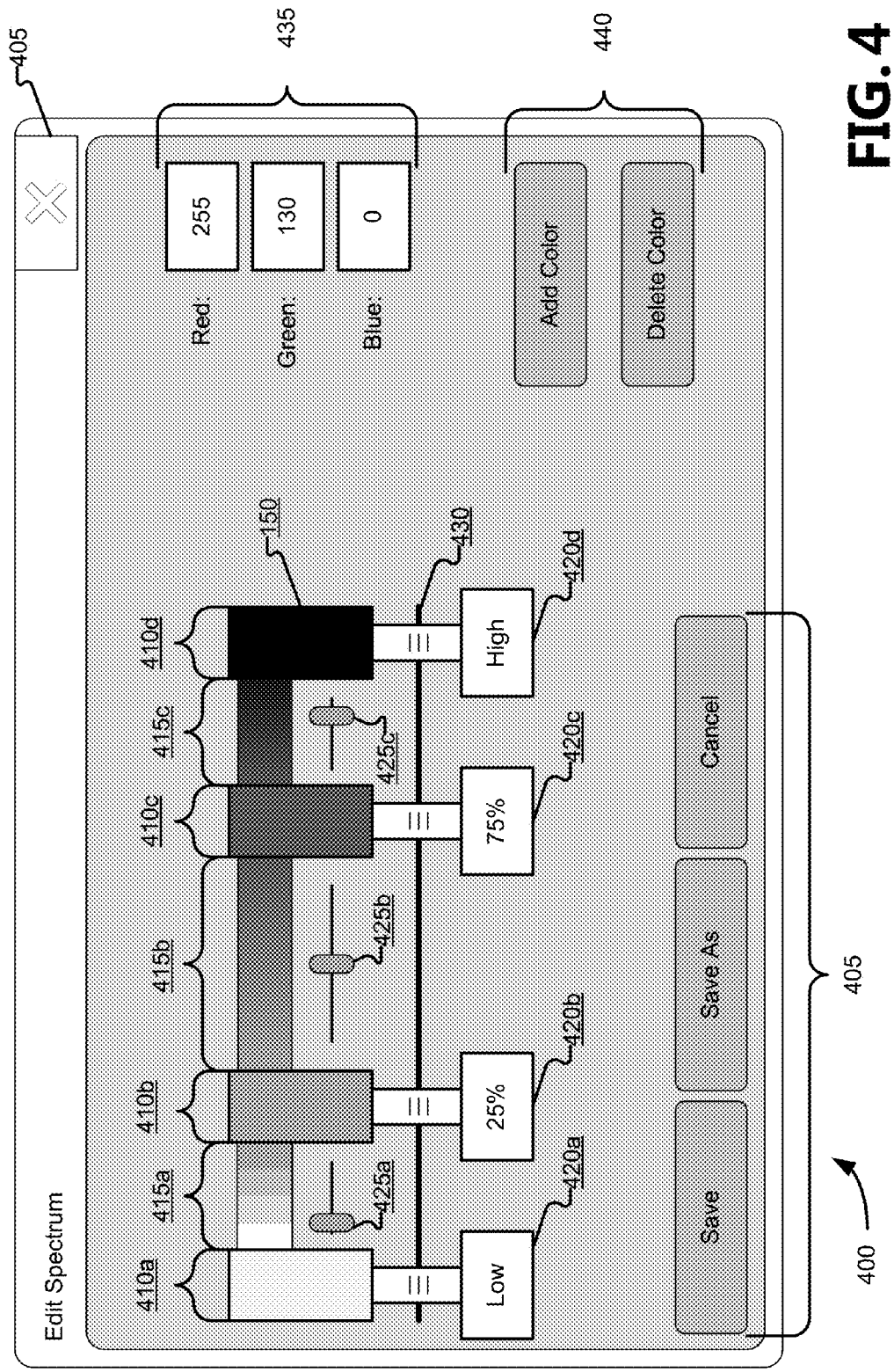
FIG. 4 illustrates a spectrum UI used to adjust colors within a value-color spectrum.

FIG. 4 illustrates a spectrum UI 400 used to adjust colors within a value-color spectrum 150. In the example spectrum UI 400, several controls are illustrated for adjusting the gradient and reference colors of a value-color spectrum 150. In various aspects, the spectrum UI 400 may be provided as a modal window or as a non-modal window, and may be docked to an edge of the displayed DVA 120, a free-floating window, or incorporated into a layer UI 300. As will be appreciated, the spectrum UI 400 illustrated in FIG. 4 is provided as a non-limiting example to discuss components and features; one of ordinary skill in the art will understand that the controls discussed herein may be provided in alternate arrangements, with alternate iconography, and with controls added or omitted to meet the needs of alternate aspects that differ from that shown in FIG. 4.

The illustrated spectrum UI 400 of FIG. 4 shows a particular value-color spectrum 150 having four reference colors and various previews and controls to adjust the composition of the value-color spectrum 150. UI controls 405 enable the user to dismiss the spectrum UI 400 and/or impart any changes made to the value-color spectrum 150 via the spectrum UI 400. For example, an "X" button or a Cancel button may be provided to dismiss the spectrum UI 400 and dismiss the changes made to the value-color spectrum 150 (or dismiss the changes made to the value-color spectrum 150 and not dismiss the spectrum UI 400). Similarly, Save, Save As, and Apply buttons may be provided to impart the changes made to the value-color spectrum 150 and save under the current spectrum or layer name, under a different spectrum or layer name, or without saving, respectively. Actuation of Save, Save As, or Apply buttons may result in the presentation of an additional window (e.g., to enter a file name, select a file path), and may result in the spectrum UI 400 being dismissed or not dismissed after completion of imparting the changes to the value-color spectrum 150.

Each of the reference colors of the value-color spectrum 150 are shown in reference previews 410 that are associated with positional identifiers 420, which in some aspects may be visually represented by displaying the positional identifiers 420 within the reference preview 410 or linked/docked to the reference preview 410 to which it is associated. In various aspects, the lowest and highest reference colors may be tagged low and high respectively, or a numeric equivalent, such as, for example 0% and 100% respectively.

In between each set of reference previews 410 are gradient previews 415, which display a preview of the gradient used in the value-color spectrum 150 to transition between a first reference color and a second reference color. In various aspects, the gradient sliders 425 are displayed proximate to the gradient previews 415, between the reference previews 410 for the colors that define the gradient, or on top of the gradient previews 415. For example, from a first reference color of white (shown in reference preview 410a) to a second reference color of gray (shown in reference preview 410b), a gradient ranging from white to gray will be produced (shown in gradient preview 415a ). The gradient previews 415 are associated with gradient sliders 425 to enable a user to affect how quickly the first reference color is blended to the second reference color for a gradient. As illustrated, a centered gradient slider 425 (e.g., second gradient slider 425b, associated with second gradient 415b) will blend colors between the two reference colors, whereas an off-center gradient slider 425 will blend to (or from) a given reference color faster (or slower) depending on the position of the selector in the gradient slider 425. In the illustrated example, the third gradient slider 425c associated with the third gradient preview 415c is off-center, which causes the gradient to transition from the reference color shown in third reference preview 410c to the reference color shown in fourth reference preview 410d slower than if the third gradient slider 425c were centered.

Although the change of colors within a gradient is referred to via speed terminology (e.g., faster, slower), the gradient slider 425 affects a size of a jump between colors within the gradients. For example, in a "slower" gradient, more colors will be present between the reference colors, while in a "faster" gradient, fewer colors will be presented between the reference colors. This may be particularly useful when trying to distinguish neighboring colors in the value-color spectrum 150 in a crowded value space or for users who have difficulties distinguishing colors, such as those using low resolution viewing devices (e.g., smartphones), those using variable fidelity/color balance viewing devices (e.g., projectors, multiple users using multiple viewing devices in a webcast presentation), and those who are affected by vision problems (e.g., partial colorblindness, cataracts).

As will be appreciated, for a given color resolution, only so many values of different colors exist between two reference colors in a digital system. For example, in a 32-bit implementation using RGB channels between reference colors red (255:0:0) and white (0:0:0), 256 different values are possible, while in a 16-bit implementation, between red (15:0:0) and white (0:0:0), only sixteen different values are possible. Accordingly, when a gradient only represents a portion of the value-color spectrum 150, a proportional section of the possible color values are allocated for that gradient. Therefore, the gradient slider 425 may have finer or courser control over the speed of the gradient's transition according to the color and value conditions.

A spectrum slider 430 is provided to enable the user to see and arrange the reference colors within the value-color spectrum 150. The positions of the reference previews 410 and positional identifiers 420 may be changed by dragging the reference previews 410, the positional identifiers 420, an associating linking feature, or by text entry in the positional identifiers 420. When reference colors change relative positions, the gradients in the gradient previews 415 are regenerated to reflect the new ordering of positional identifiers 420. The spectrum slider 430 allows for a greater, or lesser, portion of the dataset to be assigned to the colors of the gradient between the two reference colors. In the illustrated example, the bottom quartile of aggregated values from the dataset will be assigned to colors from the gradient shown in the first gradient preview 415a, the top quartile to that shown in the third gradient preview 415c, and the middle two quartiles to the second gradient 415b. By varying the range of values from the data that will be assigned to a given portion of the value-color spectrum 150, the user can set reference colors as boundary markers for variations within the dataset. For example, when heatmapping worker presence within a factory, the user may assign a small gradient to high values (e.g., the highest decade) so that small variations of presence at the workstations where the workers are expected to spend most of their time during a shift do not affect the heatmap as greatly as spending time away from the workstations (at inventory racks, a coffee machine, near another worker's station, etc.).

Reference color adjustment controls 435 are also provided for a user to manipulate the values of channels of a selected reference color via the provided text boxes. In alternate aspects, slider bars, rotary wheels, or a selectable rainbow (or other spectrum) may be proved for the user to choose from. Additionally, other color models are possible (e.g., CMYK, Pantone Matching System (PMS)). In other aspects, multiple sets of reference color controls 435 may be provided that are associated with each reference preview 410.

The spectrum UI 400 also may include amount adjustment controls 440 to add or remove reference colors, similarly to add color control 360 and remove color control 365 from the layer UI 300. When the amount adjustment controls 440 are actuated, a reference preview 410 and its associated positional identifier 420 will be added or removed to/from the spectrum UI 400 and the spectrum slider 430, and the gradients in the gradient previews 415 will be re-generated to reflect the new amount of reference colors provided.

Figure 5:
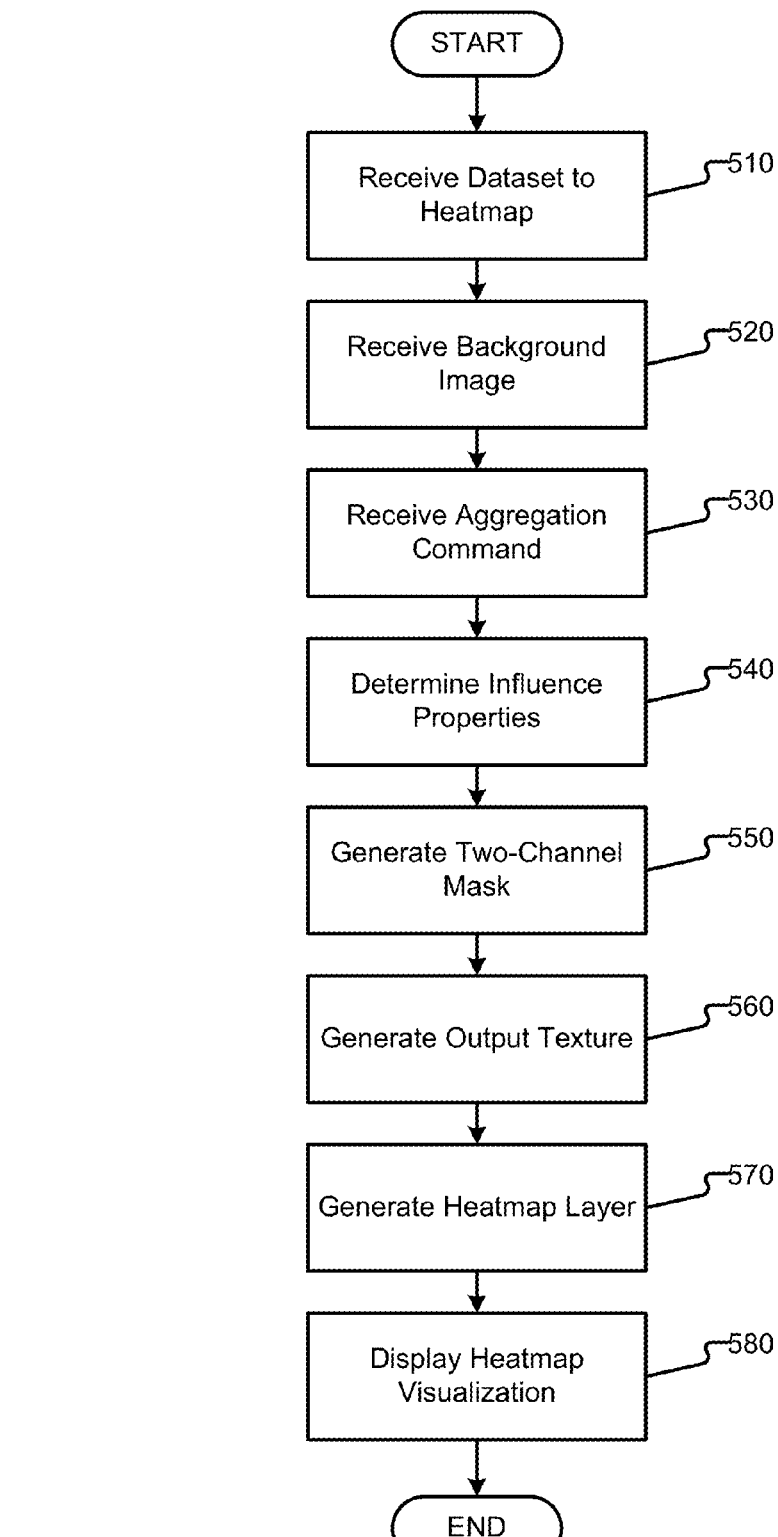
FIG. 5 is a flow chart showing general stages involved in an example method for rendering a heatmap.

FIG. 5 is a flow chart showing general stages involved in an example METHOD 500 for rendering a heatmap. METHOD 500 begins at OPERATION 510 when a dataset to heatmap is received. In various aspects, receiving the dataset includes receiving an address or reference to locate the dataset (e.g., within a spreadsheet, within a local database, at a remote database, a sensor port from which to aggregate data as they are collected) or the dataset itself. The dataset includes value information and location information for that value information, indicative of where the value information corresponds. Location information may be latitude and longitude values, addresses, map-specific coordinates (Cartesian, polar, etc.), and object identifiers (e.g., the Empire State building, Interstate 40 from mile marker 386 to mile marker 389, school district 5) that can be correlated to coordinates or ranges of coordinates.

At OPERATION 520 a background image associated with a coordinate space is received. In various aspects, the background image is a two-dimensional or three-dimensional image that may be supplied as part of the dataset, be specified in the dataset (e.g., as an address to a third party or a lookup code for a built-in background image of a DVA 120), or may be supplied by the DVA 120 based on the location information in the dataset. For example, if the location information corresponds to global positioning system (GPS) coordinates, the DVA 120 will search a database or rotate/pan/zoom a built-in background image to provide a background image that encompasses the location information. In various aspects, a background image that encompasses the location information includes locations specified by the location information and additional locations to format the background image to fit into a rectangular display and include a margin (e.g., locations further north, west, south, and east of the locations specified by the dataset). Various preferences may affect a range of a margin to be a set percentage of the background image (e.g., no more than n % of the area of the background image) that is initially presented as margin by the DVA 120.

METHOD 500 proceeds to OPERATION 530, where an aggregation command is received. In various aspects, an aggregation command includes a request from a user to see the heatmap of a sum of the value information, as a count of the value information entries, a mean of the value information, or a specific value from the value information for each location (e.g., maximum, minimum, median, mode). In various aspects, the aggregation command is received via a UI element of the DVA 120, such as an aggregation control 340.

Proceeding to OPERATION 540, the influence properties for the heatmap format visualization are determined. In various aspects, the influence properties include transparency, color offsets (e.g., a color blind mode, color matching between viewing devices), and bloom effects that are set according to UI elements of the DVA 120 such as opacity controls 315, color scale controls 320, and radius of influence controls 325, respectively. Once a heatmap has been displayed by the DVA 120, a lock control 330 may also influence properties of the heatmap, such that the scale of the heatmap adjusts or remains constant as the user zooms in/out of the background image when the lock control 330 is unselected or selected respectively.

In various aspects, the influence properties may be applied at different operations of METHOD 500. For example, the transparency and color scale properties may be applied at OPERATIONS 570 or 580 to affect the colors of the value-color spectrum 150 or the layer itself. The bloom effects may be applied at OPERATIONS 510, 550, or 560 by a blur function so that values for coordinates between the coordinates specified by the data points (e.g., interstitial regions) may be calculated based on the surrounding values that are part of the dataset when the dataset is received, the two-channel mask is generated, or the output texture is generated. The lock properties may be applied at OPERATIONS 560 or 580 when the output texture is stored or as the user zooms the displayed visualization respectively.

At OPERATION 550 a two-channel mask is generated for the dataset. The first channel of the two-channel mask encodes the value information from the dataset organized according to the location information, while the second channel encodes weight information, also organized according to the location information. In various aspects, the value information is encoded as a sum of the values at each given location, while in other aspects the value information is encoded as an array of the values at each given location. Weight information, in various aspects, includes counts of value information data points at a given location according to the location information or, alternatively or additionally, data series specified by the user as weight information for the value information (e.g., recency, confidence, user-supplied counts as substitutions or supplements to counts made by the DVA 120). The weight information in the second channel is used in conjunction with the value information in the first channel to affect various properties of the visualization, including the radius of influence for the value information in the heatmap or that values themselves (e.g., to divide the summed values to display a mean value), but is maintained separately from the value information so that the DVA 120 may manipulate each channel separately and deal with fewer data points. As will be appreciated, for a given location there may be a multitude (tens, hundreds, thousands, etc.) of data points in the dataset, which can be reduced down to a corresponding value and weight for that location, thus simplifying the inputs used by the DVA 120 (and needing to be transmitted from a user device 110).

As will be appreciated, the coordinate space of the background image will affect the grouping of value information to be summed for encoding in the first channel and the weights for the second channel. For example, if the coordinate space of the background image uses latitude and longitude coordinates specific to two decimal places, but the location information from the dataset is specific to more than two decimal places (3, 4, etc.), the location information may be rounded or truncated to two decimal places, like the coordinate space, thereby grouping more value data points together than the dataset originally indicates. Similarly, if the location information is in a different format from the coordinate space, it will be converted to the format of the coordinate space before the value information and weights are encoded. For example, if the location information specifies addresses and location names (e.g., 123 Elm Street, the IDS Center suite 3200, the Grand Canyon, Id.), but the coordinate space uses GPS coordinates, the location data will be converted to the format of the coordinate space, which in this example would be GPS coordinates. In various aspects, the DVA 120 includes a conversion function, and may consult an external service to convert one format to the other, which may use a central point, entrance point, or other point to represent as a whole the coordinates that comprise a feature (i.e., the synedochtic aggregation of location information for conversion), or enable the user to define custom conversions.

The value information that share location information according to the coordinate space are grouped together when encoded in the first channel, and weight information for the value information, also organized by the shared location information, are encoded in the second channel. In various aspects, the value information may be stored as sums of value information sharing location information in the first channel and the weights as counts of data points of the summed value information, while in other aspects, an array of value information entries is stored for each location. These data may be stored in a rectangular grid in a temporary buffer by a geometry shader before performing a third pass to sample colors from the value-color spectrum 150.

At OPERATION 560 an output texture is generated. The output texture is generated by expanding the two-channel mask into a two-dimensional texture and normalizing the value information from the two-dimensional texture according to the value-color spectrum 150. As will be appreciated, value-color spectra 150 include a plurality of colors arranged in gradients between various reference colors that are set as color stops within the value-color spectra 150. Color stops may be set at relative positions within the value-color spectrum 150 (e.g., at the minima, at the maxima, at the n % mark) and/or may be assigned to specific values (e.g., the reference color blue is to be assigned values equal to fifty, the reference color red is to be assigned values over ninety).

The first channel and the second channel from the two-channel mask are expanded into the two-dimensional output texture, depending on the user settings in the DVA 120. As the location information of the two channels may identify specific points, but a heatmap is displayed at interstitial locations, and the radius of influence setting is used to determine the interstitial values. For a given location with associated value information and weight information, the radius of influence setting states a fall-off of the value information (e.g., the value is reduced by x for every distance unit (meter, mile, degree of arc) from the location until zero value is reached). If two or more locations with value information have overlapping radii of influence, the values of those locations (interstitial or designated) may be additively or multiplicatively combined. In various aspects, the radius of influence may also affect a fall-off of the weight information for a location, which may also be additively or multiplicatively combined when two or more radii overlap in the output texture, or may affect how the value information are combined in overlapping radii.

Normalization of the value information (both interstitial and from the first channel) is done according to the number of colors and specific values of the dataset within a range, resulting in the value information being categorized when the number of specific values exceeds the number of colors for a range or the colors being categorized when the number of colors in a gradient exceeds the number of specific values for a range, which defines the gradient between two reference colors.

For example, if a range represents the entire value-color spectrum 150, which is defined as three colors (e.g., red-orange-yellow) and the dataset includes one hundred locations, each location having one of six specific values (e.g., 1, 2, 3, 4, 5, and 6), the number of specific values exceeds the number of colors for the range (three), and the specific values will be categorized according the value-color spectrum 150 into a number of categories equal to the number of colors.

Similarly in another example, if a range represents the entire value-color spectrum 150, which is defined as five colors (e.g., red-orange-yellow-green-blue) and the dataset includes one hundred locations, each location having one of three specific values (e.g., −1, 0, and 1), the number of colors (five) exceeds the number of specific values (three) for the range, and specific values will be assigned to a subset of the plurality of colors, with a preference for the reference colors over colors from the gradient. Additionally or alternatively, colors from the gradient over which the reference colors were preferred may be used for "bloom" effects in a heatmap between the data points.

In yet another example, where reference colors for red, yellow, and blue are set to the minima, the value of fifty-five, and the maxima, respectively, to define a value-color spectrum 150 of red-[several shades of orange]-yellow-[several shades of green]-blue, the number of values having values between the minima and fifty-five, and between fifty-five and the maxima will affect the number of shades that will be displayed as part of the value-color spectrum 150.

Normalization results in each specific value being associated with one color from the value-color spectrum 150, such that, for example, a value of x and a value of y may both be associated with a first color regardless of the locations at which values of x or y are associated with the background image or the number of data points having the values of x or y. The values are stored as normalizations so that, if the user adjusts the reference colors, the DVA 120 will not need to look up the new color values.

In various aspects, the output texture is stored in memory as a grid (i.e., a two-dimensional image) having the dimensions of the background image and a resolution of the coordinate space of the background image. In various aspects the grid may be saved as a bitmap, JPEG, GIF, CAD file or other image file. In various aspects, multiple resolutions may be stored in a mipmap, and, if a lock control 330 is selected, each resolution stored in the mipmap will be the same output texture cropped to fit each resolution, whereas if a lock control 330 is not selected, each resolution stored in the mipmap will be a zoomed version of the heatmap format visualization sized according to the resolution.

METHOD 500 proceeds to OPERATION 570, where a heatmap layer is generated. The heatmap layer is generated by the DVA 120 by comparing the output texture with the value-color spectrum 150 to display colors corresponding to the values in the output texture at locations aligned with the background image's coordinate space.

In various aspects, aligning the heatmap layer with the background image is achieved according to reference points. A reference point may include origins in the coordinate space and the location information, which may be adjusted by offsets to align the layer and the image. A reference point may also be a reference feature (e.g., a building, town, mountain, river, border, road) on the background image that is referenced by the location data.

At OPERATION 580 the heatmap visualization is displayed by the DVA 120, and the user may navigate and manipulate the visualization, make changes to preferences of data selections used to initially generate the heatmap, set the heatmap as a scene as part of a tour, print the heatmap, save the heatmap, etc. METHOD 500 then concludes.

Figure 6:
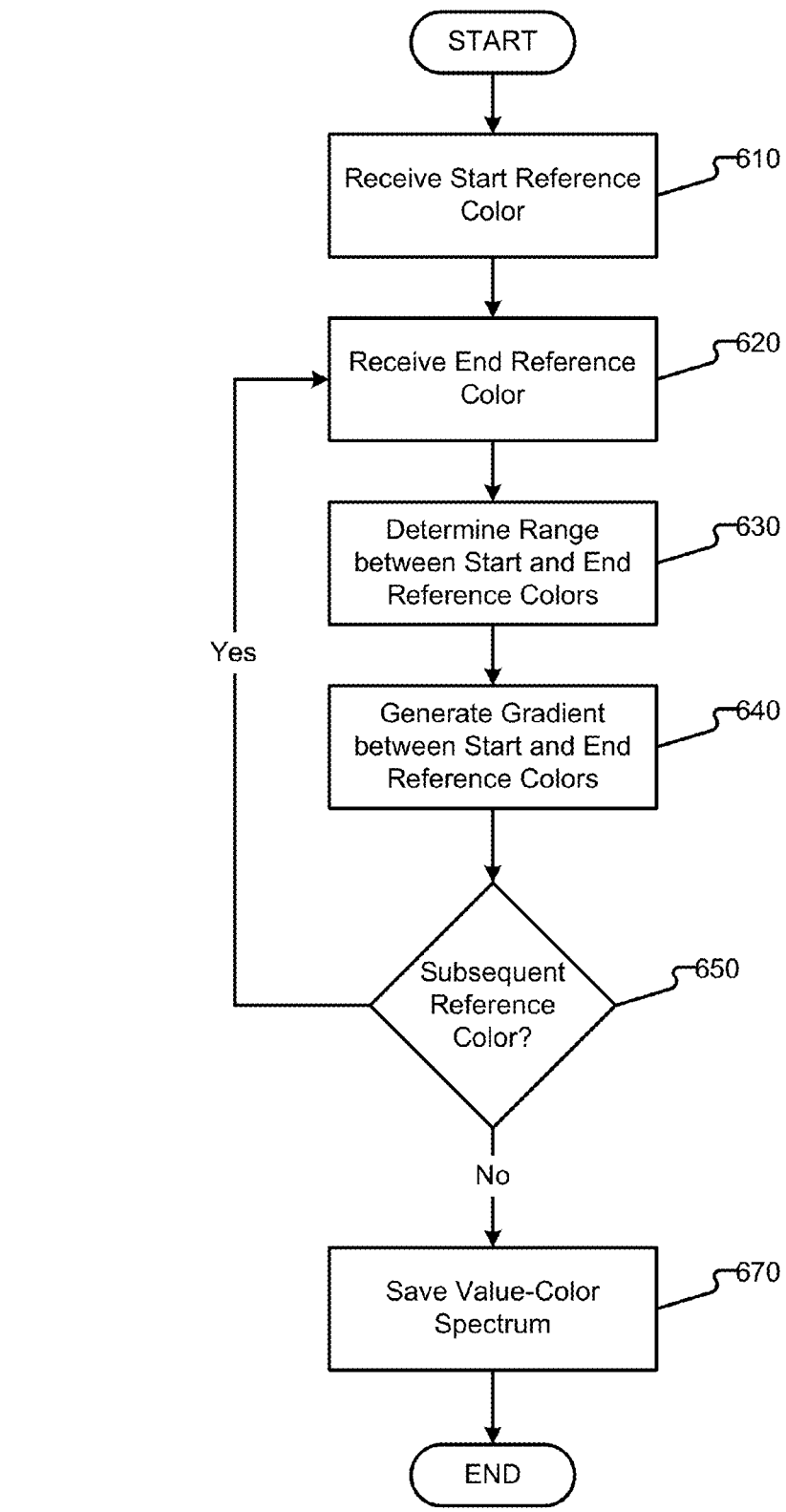
FIG. 6 is a flow chart showing general stages involved in an example method for customizing a value-color spectrum for a heatmap.

FIG. 6 is a flow chart showing general stages involved in an example METHOD 600 for customizing a value-color spectrum 150 for a heatmap. Method 600 beings at OPERATION 610, where a start reference color is received, and proceeds to OPERATION 620, where an end reference color is received. Reference colors include various channel information to define a color (including a no-color), and may be associated with various ranges for a value-color spectrum 150 which may be included with the reference color when it is received in OPERATION 610 or 620. In various aspects, reference colors may be set via a spectrum control 350, reference color controls 355, reference previews 410, or the like.

At OPERATION 630 the range between the start and end reference colors is determined. In various aspects, the range is a determination of how many potential colors can exist between the two reference colors, and user preferences on what percentage of those potential colors should be used. For example, if the reference colors have channel values of 0:0:0 (white) and 0:0:2 (a very light blue), only one potential color (0:0:1) may be determined to comprise the range. In another example, if the reference colors have channel values of 0:0:0 (white) and 0:0:255 (blue), 254 potential colors will be determined to comprise the range. When a user selects no-color as a reference color, the range of potential colors will be equivalent to the potential number of levels of transparency between fully transparent and fully opaque (254 in a 32-bit implementation). However, user preferences (or the dataset) may request a smaller portion of the potential colors to comprise the gradient between the two reference colors, for example, requesting that only n colors or n % of available colors to be returned in the range. In various aspects, user preferences on the potential colors to include in a gradient may be set via gradient sliders 425.

METHOD 600 then proceeds to OPERATION 640 where the range is used to generate a gradient per the user's specifications between the start and end reference colors. Continuing the above example with reference colors of white and blue, a gradient having every shade of blue between the two reference colors (254 in a 32-bit implementation) may be produced. Alternatively, if the user preference (or the dataset) specify that only three interstitial colors are to comprise the gradient, the colors will be selected as evenly as possible from the potential colors (i.e., with the greatest possible differences in color-space between reference and gradient colors with equal (±1 in any given channel) distribution between adjacent colors) so that the example gradient comprises the colors 0:0:64, 0:0:128, and 0:0:192 between the reference colors of 0:0:0 and 0:0:255.

At DECISION 650 it is determined whether a subsequent reference color exists. For example, a user may have specified three reference colors (i.e., one reference color in addition to the reference colors received in OPERATIONS 610 and 620) or may have selected an add color control 360.

When a subsequent reference color exists, METHOD 600 returns to OPERATION 620 where the subsequent reference color is received as the end reference color, and the previously received end reference color is re-designated as the start reference color so that METHOD 600 will run through OPERATIONS 630 and 640 again with new colors and (potentially) new user preferences for how to generate the gradient between the two reference colors, as described above.

When no (further) subsequent colors exist, METHOD 600 proceeds to OPERATION 670, where individual gradients and the reference colors are assembled into a value-color spectrum 150, and the value-color spectrum is saved. In various aspects, the value-color spectrum 150 is saved as a 1×n image file, where n is equal to the number of colors included in the value-color spectrum 150. METHOD 600 then concludes.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 7:
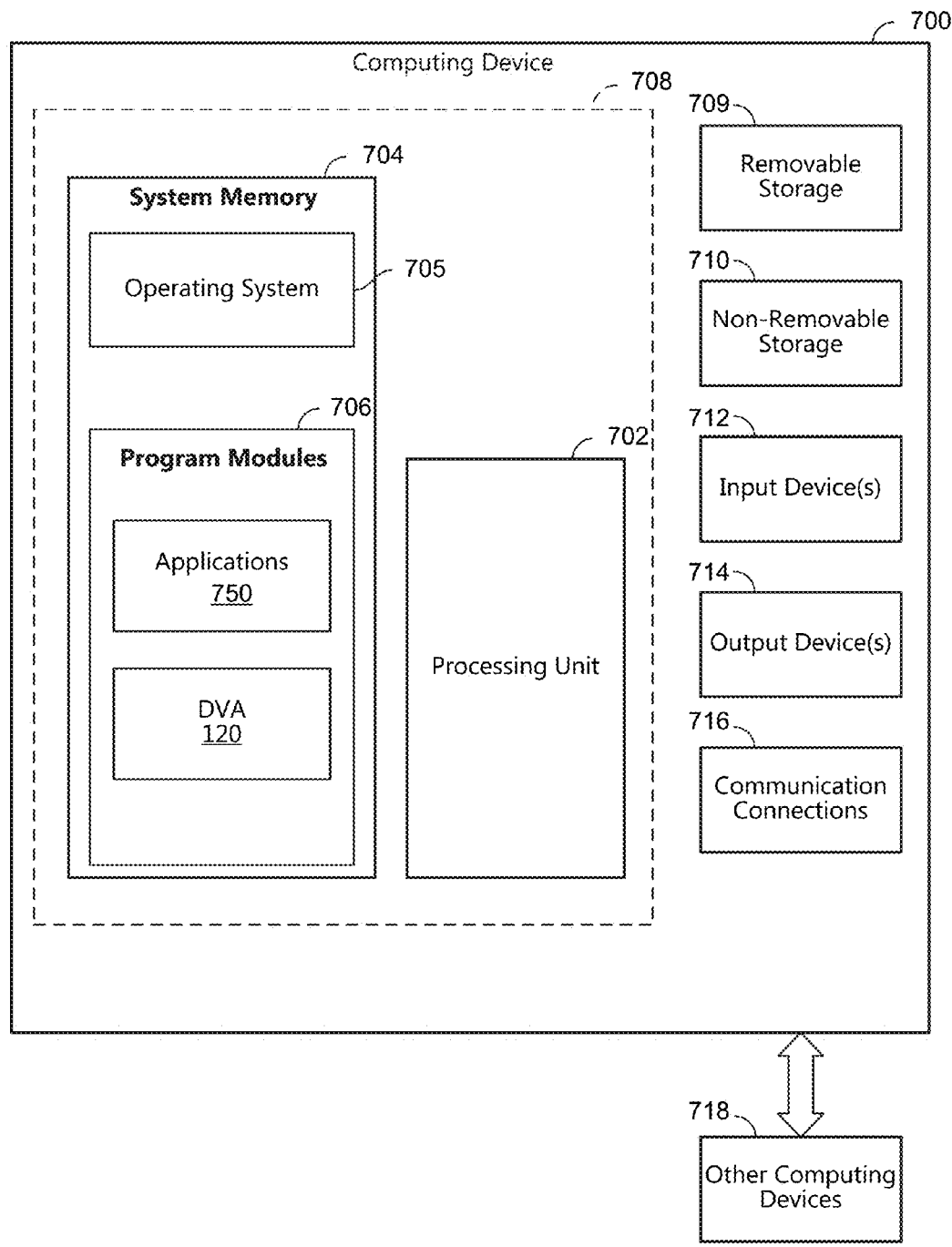
FIG. 7 is a block diagram illustrating example physical components of a computing device.

FIGS. 7-9 and the associated descriptions provide a discussion of a variety of operating environments in which examples are practiced. However, the devices and systems illustrated and discussed with respect to FIGS. 7-9 are for purposes of example and illustration and are not limiting of a vast number of computing device configurations that are utilized for practicing aspects, described herein.

FIG. 7 is a block diagram illustrating physical components (i.e., hardware) of a computing device 700 with which examples of the present disclosure may be practiced. In a basic configuration, the computing device 700 includes at least one processing unit 702 and a system memory 704. According to an aspect, depending on the configuration and type of computing device, the system memory 704 comprises, but is not limited to, volatile storage (e.g., random access memory), non-volatile storage (e.g., read-only memory), flash memory, or any combination of such memories. According to an aspect, the system memory 704 includes an operating system 705 and one or more program modules 706 suitable for running software applications 750. According to an aspect, the system memory 704 includes DVA 120. The operating system 705, for example, is suitable for controlling the operation of the computing device 700. Furthermore, aspects are practiced in conjunction with a graphics library, other operating systems, or any other application program, and are not limited to any particular application or system. This basic configuration is illustrated in FIG. 7 by those components within a dashed line 708. According to an aspect, the computing device 700 has additional features or functionality. For example, according to an aspect, the computing device 700 includes additional data storage devices (removable and/or non-removable) such as, for example, magnetic disks, optical disks, or tape. Such additional storage is illustrated in FIG. 7 by a removable storage device 709 and a non-removable storage device 710.

As stated above, according to an aspect, a number of program modules and data files are stored in the system memory 704. While executing on the processing unit 702, the program modules 706 (e.g., DVA 120) perform processes including, but not limited to, one or more of the stages of the methods 500 and 600 illustrated in FIGS. 5 and 6. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 7 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 700 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 700 has one or more input device(s) 712 such as a keyboard, a mouse, a pen, a sound input device, a touch input device, etc. The output device(s) 714 such as a display, speakers, a printer, etc. are also included according to an aspect. The aforementioned devices are examples and others may be used. According to an aspect, the computing device 700 includes one or more communication connections 716 allowing communications with other computing devices 718. Examples of suitable communication connections 716 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. According to an aspect, any such computer storage media is part of the computing device 700. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

Figure 8A:
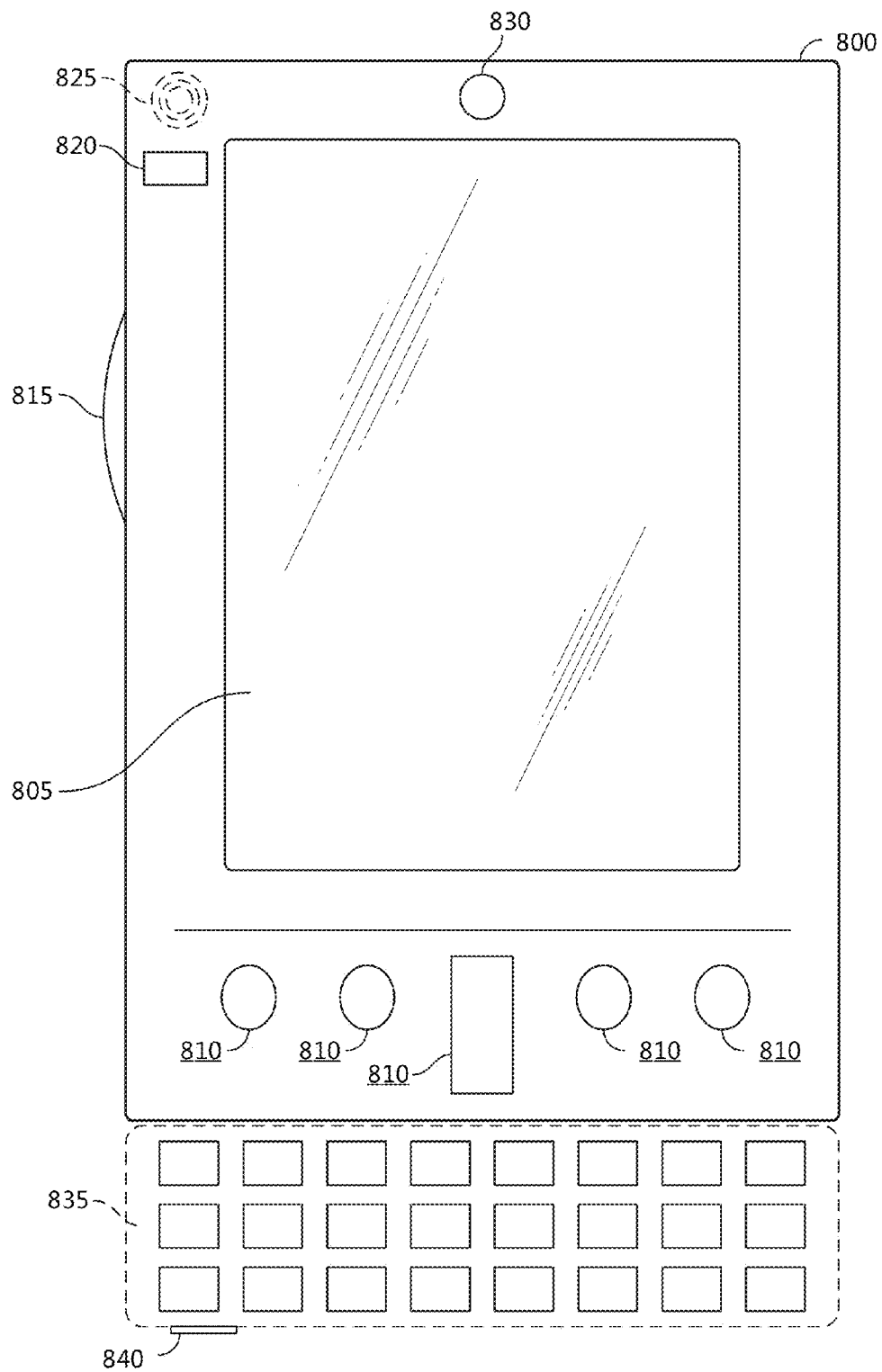
FIGS. 8A and 8B are block diagrams of a mobile computing device.
Figure 8B:
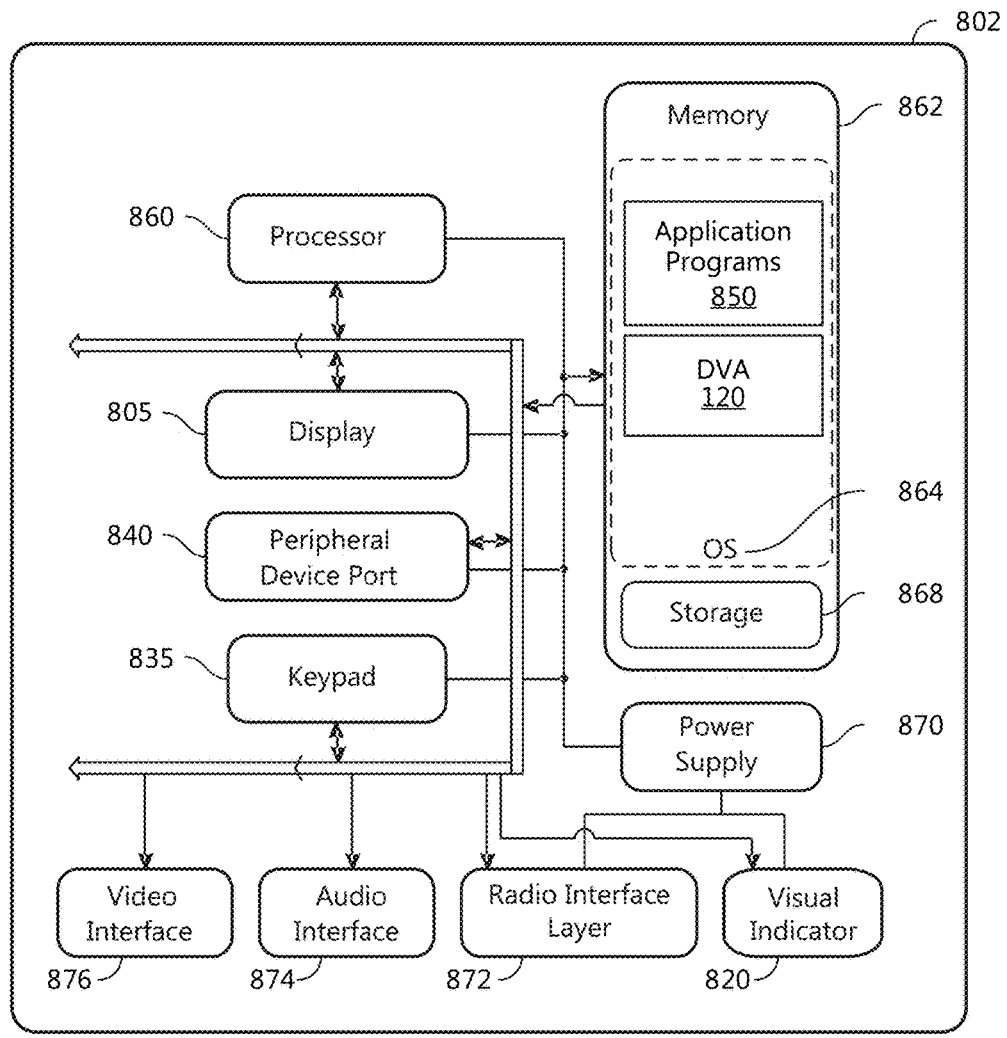

FIGS. 8A and 8B illustrate a mobile computing device 800, for example, a mobile telephone, a smart phone, a tablet personal computer, a laptop computer, and the like, with which aspects may be practiced. With reference to FIG. 8A, an example of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. According to an aspect, the display 805 of the mobile computing device 800 functions as an input device (e.g., a touch screen display). If included, an optional side input element 815 allows further user input. According to an aspect, the side input element 815 is a rotary switch, a button, or any other type of manual input element. In alternative examples, mobile computing device 800 incorporates more or fewer input elements. For example, the display 805 may not be a touch screen in some examples. In alternative examples, the mobile computing device 800 is a portable phone system, such as a cellular phone. According to an aspect, the mobile computing device 800 includes an optional keypad 835. According to an aspect, the optional keypad 835 is a physical keypad. According to another aspect, the optional keypad 835 is a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some examples, the mobile computing device 800 incorporates a vibration transducer for providing the user with tactile feedback. In yet another example, the mobile computing device 800 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 800 incorporates peripheral device port 840, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one example of a mobile computing device. That is, the mobile computing device 800 incorporates a system (i.e., an architecture) 802 to implement some examples. In one example, the system 802 is implemented as a "smart phone" capable of running one or more applications (e.g., browser, e-mail, calendaring, contact managers, messaging clients, games, and media clients/players). In some examples, the system 802 is integrated as a computing device, such as an integrated personal digital assistant (PDA) and wireless phone.

According to an aspect, one or more application programs 850 are loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. According to an aspect, DVA 120 is loaded into memory 862. The system 802 also includes a non-volatile storage area 868 within the memory 862. The non-volatile storage area 868 is used to store persistent information that should not be lost if the system 802 is powered down. The application programs 850 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800.

According to an aspect, the system 802 has a power supply 870, which is implemented as one or more batteries. According to an aspect, the power supply 870 further includes an external power source, such as an AC adapter or a powered docking cradle that supplements or recharges the batteries.

According to an aspect, the system 802 includes a radio 872 that performs the function of transmitting and receiving radio frequency communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs 850 via the operating system 864, and vice versa.

According to an aspect, the visual indicator 820 is used to provide visual notifications and/or an audio interface 874 is used for producing audible notifications via the audio transducer 825. In the illustrated example, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. According to an aspect, the system 802 further includes a video interface 876 that enables an operation of an on-board camera 830 to record still images, video stream, and the like.

According to an aspect, a mobile computing device 800 implementing the system 802 has additional features or functionality. For example, the mobile computing device 800 includes additional data storage devices (removable and/or non-removable) such as, magnetic disks, optical disks, or tape. Such additional storage is illustrated in FIG. 8B by the non-volatile storage area 868.

According to an aspect, data/information generated or captured by the mobile computing device 800 and stored via the system 802 are stored locally on the mobile computing device 800, as described above. According to another aspect, the data are stored on any number of storage media that are accessible by the device via the radio 872 or via a wired connection between the mobile computing device 800 and a separate computing device associated with the mobile computing device 800, for example, a server computer in a distributed computing network, such as the Internet. As should be appreciated such data/information are accessible via the mobile computing device 800 via the radio 872 or via a distributed computing network. Similarly, according to an aspect, such data/information are readily transferred between computing devices for storage and use according to well-known data/information transfer and storage means, including electronic mail and collaborative data/information sharing systems.

FIG. 9 illustrates one example of the architecture of a system for improved provision of custom heatmaps as described above. Content developed, interacted with, or edited in association with the DVA 120 is enabled to be stored in different communication channels or other storage types. For example, various documents may be stored using a directory service 922, a web portal 924, a mailbox service 926, an instant messaging store 928, or a social networking site 930. The DVA 120 is operative to use any of these types of systems or the like for improving efficiency of providing custom heatmaps, as described herein. According to an aspect, a server 920 provides the DVA 120 to clients 905*a,b,c*. As one example, the server 920 is a web server providing the DVA 120 over the web. The server 920 provides the DVA 120 over the web to clients 905 through a network 940. By way of example, the client computing device is implemented and embodied in a personal computer 905*a*, a tablet computing device 905*b* or a mobile computing device 905*c* (e.g., a smart phone), or other computing device. Any of these examples of the client computing device are operable to obtain content from the store 916.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer-implemented method for generating a custom heatmap, comprising:
receiving a background image associated with a coordinate space;
receiving a first reference color;
receiving a second reference color;
generating, with a processor, a value-color spectrum by creating a gradient between the first reference color and the second reference color;
storing the value-color spectrum in a first memory location;
receiving a dataset having value information and location information;
generating, with the processor, a two-channel mask having a first channel and a second channel, wherein the first channel encodes sums of the value information sharing location information and the second channel encodes weights of the value information sharing location information;
storing the two-channel mask in a second memory location;
producing an output texture as a two-dimensional image having a plurality of values corresponding to the two-channel mask expanded in two-dimensions to include interstitial values for interstitial locations based on a radius of influence and values from the first channel and the second channel;

normalizing the plurality of values in the output texture according to the value-color spectrum;

comparing, with the processor, the output texture with the value-color spectrum to produce a heatmap layer, wherein the heatmap layer assigns a plurality of colors at a plurality of locations in the two-dimensional image of the output texture corresponding to the location information, wherein the plurality of colors are selected from the value-color spectrum according to the normalized plurality of values;

aligning the heatmap layer with the background image according to the coordinate space and the location information; and displaying the heatmap layer over the background image.

2. The method of claim 1, wherein generating the two-channel mask further comprises:

creating a blended value, according to a radius of influence parameter for the dataset, based on the value information from data points of the dataset having different location information.

3. The method of claim 1, wherein the first reference color and the second reference color each specify a transparency value.

4. The method of claim 1, further comprising:

receiving a third reference color; and wherein generating the value-color spectrum further comprises creating a second gradient between the second reference color and the third reference color.

5. The method of claim 1, further comprising:

receiving an aggregation option selected from the group consisting of:
 a minimum value at a given location;
 a maximum value at the given location;
 a median value at the given location;
 a mode for the value information at the given location;
 a mean for the value information at the given location;
 a count of entries of the value information at the given location; and
 a sum of the value information at the given location; and wherein producing the output texture having the plurality of values produces the plurality of values according to the aggregation option selected.

6. The method of claim 1, wherein the first reference color is selected as a lowest color in the value-color spectrum to map to a lowest normalized value and the second reference color is selected as a highest color in the value-color spectrum to map to a highest normalized value.

7. The method of claim 1, further comprising locking a scale of the heatmap, wherein locking the scale of the heatmap enables the heatmap to remain a constant size as the background image is viewed with different zoom settings.

8. The method of claim 1, wherein the coordinate space and the location information use different data formats, further comprising converting a data format of the location information to a data format of the coordinate space.

9. The method of claim 1, wherein the background image is a three-dimensional image, wherein the heatmap layer is a two-dimensional image, and wherein aligning the heatmap layer with the background image according to the coordinate space and the location data further comprises projecting the two-dimensional image of the heatmap layer to the three-dimensional image of the background image.

10. The method of claim 1, wherein storing the value-color spectrum in the first memory location stores the value-color spectrum as file for the custom heatmap.

11. A data visualization application for generating a custom heatmap, comprising:

a first memory location for storing a first reference color;

a second memory location for storing a second reference color;

a third memory location for storing a background image;

a fourth memory location for storing a dataset comprising data having both value information and location information;

a processor that generates a value-color spectrum, a two-channel mask, an output texture, and a heatmap layer, and that aligns the heatmap layer with the background image for display over the background image;

wherein the value-color spectrum comprises a gradient between the first reference color and the second reference color;

wherein the two-channel mask comprises a first channel encoding sums of the value information for the data that share location information and a second channel encoding weights of the value information for the data that share location information;

wherein the output texture is a two-dimensional image encoding normalized values which are organized in two-dimensions according to the location data, wherein the normalized values include interstitial value information based on the first channel and the second channel normalized according to the value-color spectrum; and wherein the heatmap layer assigns a plurality of colors from the value-color spectrum according to the normalized values in the output texture.

12. The data visualization application of claim 11, wherein the first channel and the second channel summarize a plurality of data points from the dataset that share the location information in the dataset.

13. The data visualization application of claim 12, wherein the weights are a count of the data points of the plurality of data points from the dataset that share the location information in the dataset.

14. The data visualization application of claim 13, wherein a user is enabled to specify to whether the normalized values are based on an average or the count for the data points.

15. The data visualization application of claim 11, wherein the processor is further operable to lock a scale of the heatmap to enable the heatmap to remain a constant size as the background image is viewed with different zoom settings.

16. The data visualization application of claim 11, wherein the location information specifies location names.

17. The data visualization application of claim 16, wherein a coordinate space of the background image is formatted according to a different format than the location information, the processor converting the location information into the different format.

18. A computer readable storage medium including instructions configured to perform the method comprising:

receiving a background image associated with a coordinate space;

receiving a first reference color;

receiving a second reference color;

generating, with a processor, a value-color spectrum by creating a gradient between the first reference color and the second reference color;

storing the value-color spectrum in a first memory location;

receiving a dataset having value information and location information;

generating, with the processor, a two-channel mask having a first channel and a second channel, wherein the first channel encodes sums of the value information sharing location information and the second channel encodes weights of the value information sharing location information;

storing the two-channel mask in a second memory location;

producing an output texture as a two-dimensional image having a plurality of values corresponding to the two-channel mask expanded in two-dimensions to include interstitial values for interstitial locations based on a radius of influence and values from the first channel and the second channel;

normalizing the plurality of values in the output texture according to the value-color spectrum;

comparing, with the processor, the output texture with the value-color spectrum to produce a heatmap layer, wherein the heatmap layer assigns a plurality of colors at a plurality of locations in the two-dimensional image of the output texture corresponding to the location information, wherein the plurality of colors are selected from the value-color spectrum according the normalized plurality of values;

aligning the heatmap layer with the background image according to the coordinate space and the location information; and displaying the heatmap layer over the background image.

19. The computer readable storage medium of claim 18, wherein the method further comprises:

receiving a third reference color; and wherein generating the value-color spectrum further comprises creating a second gradient between the second reference color and the third reference color.

20. The computer readable storage medium of claim 18, wherein the method further comprises:

receiving a value-color order, the value-color order specifying where a given reference color is to appear in the value-color spectrum;

receiving a color stop size, the color stop size specifying a number of gradient colors between two given reference colors in the value-color spectrum; and wherein generating the value-color spectrum further comprises arranging the first reference color and the second reference color according to the value-color order and generating the gradient colors between the first reference color and the second reference color according to the color stop size.

* * * * *